US012360941B2

(12) United States Patent
Brewer

(10) Patent No.: US 12,360,941 B2
(45) Date of Patent: **\*Jul. 15, 2025**

(54) METHOD OF NOTIFYING A PROCESS OR PROGRAMMABLE ATOMIC OPERATION TRAPS

(71) Applicant: Micron Technology, Inc., Boise, ID (US)

(72) Inventor: Tony Brewer, Plano, TX (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/383,311

(22) Filed: Oct. 24, 2023

(65) Prior Publication Data
US 2024/0054100 A1 Feb. 15, 2024

Related U.S. Application Data

(63) Continuation of application No. 17/901,480, filed on Sep. 1, 2022, now Pat. No. 11,829,323, which is a (Continued)

(51) Int. Cl.
*G06F 15/82* (2006.01)
*G06F 9/4401* (2018.01)

(52) U.S. Cl.
CPC ............ *G06F 15/82* (2013.01); *G06F 9/4406* (2013.01)

(58) Field of Classification Search
None
See application file for complete search history.

(56) References Cited

U.S. PATENT DOCUMENTS 7,197,445 B1 * 3/2007 Deepak ................. G06F 30/33
703/22
7,447,794 B1 11/2008 Miller et al.
(Continued)

FOREIGN PATENT DOCUMENTS

CN 103299272 A 9/2013
CN 103473181 A 12/2013
(Continued)

OTHER PUBLICATIONS

"Chinese Application Serial No. 202111215429.9, Voluntary Amendment filed Aug. 12, 2022", with English claims, 26 pages.
(Continued)

*Primary Examiner* — Eric Coleman
(74) *Attorney, Agent, or Firm* — Schwegman Lundberg & Woessner, P.A.

(57) ABSTRACT

Disclosed in some examples, are methods, systems, programmable atomic units, and machine-readable mediums that provide an exception as a response to the calling processor. That is, the programmable atomic unit will send a response to the calling processor. The calling processor will recognize that the exception has been raised and will handle the exception. Because the calling processor knows which process triggered the exception, the calling processor (e.g., the Operating System) can take appropriate action, such as terminating the calling process. The calling processor may be a same processor as that executing the programmable atomic transaction, or a different processor (e.g., on a different chiplet).

20 Claims, 10 Drawing Sheets

Related U.S. Application Data continuation of application No. 17/074,779, filed on Oct. 20, 2020, now Pat. No. 11,436,187.

(56) References Cited

U.S. PATENT DOCUMENTS

| | | |
|---|---|---|
| 7,941,641 B1 | 5/2011 | Jung |
| 8,122,229 B2 | 2/2012 | Wallach et al. |
| 8,156,307 B2 | 4/2012 | Wallach et al. |
| 8,205,066 B2 | 6/2012 | Brewer et al. |
| 8,423,745 B1 | 4/2013 | Brewer |
| 8,560,816 B2 | 10/2013 | Goodman et al. |
| 8,561,037 B2 | 10/2013 | Brewer et al. |
| 8,739,164 B2 | 5/2014 | Chung et al. |
| 9,355,109 B2 | 5/2016 | Archak et al. |
| 9,710,384 B2 | 7/2017 | Wallach et al. |
| 10,007,520 B1 | 6/2018 | Ross |
| 10,642,538 B1 | 5/2020 | MacLaren et al. |
| 10,733,171 B2 | 8/2020 | Park |
| 10,783,295 B1 | 9/2020 | Dong et al. |
| 10,896,001 B1 | 1/2021 | Volpe et al. |
| 10,990,391 B2 | 4/2021 | Brewer |
| 10,990,392 B2 | 4/2021 | Brewer |
| 11,403,023 B2 | 8/2022 | Brewer |
| 11,436,187 B2 | 9/2022 | Brewer |
| 11,586,439 B2 | 2/2023 | Brewer |
| 11,693,690 B2 | 7/2023 | Brewer |
| 11,740,929 B2 | 8/2023 | Brewer |
| 11,829,323 B2 | 11/2023 | Brewer |
| 11,989,556 B2 | 5/2024 | Brewer |
| 12,020,062 B2 | 6/2024 | Brewer |
| 2006/0004882 A1 | 1/2006 | Itikarlapalli et al. |
| 2008/0040587 A1* | 2/2008 | Burke ............... G06F 11/3648 |
| | | 714/E11.208 |
| 2008/0270708 A1 | 10/2008 | Warner et al. |
| 2009/0198920 A1 | 8/2009 | Arimilli et al. |
| 2009/0282410 A1 | 11/2009 | Moir et al. |
| 2010/0106934 A1 | 4/2010 | Calder et al. |
| 2010/0205408 A1 | 8/2010 | Chung et al. |
| 2010/0218049 A1 | 8/2010 | Mostow |
| 2011/0246724 A1 | 10/2011 | Marathe et al. |
| 2012/0066457 A1 | 3/2012 | Hertzberg et al. |
| 2012/0079177 A1 | 3/2012 | Brewer et al. |
| 2012/0159127 A1 | 6/2012 | Spradlin |
| 2012/0198205 A1 | 8/2012 | Eilert |
| 2012/0311544 A1 | 12/2012 | Higgs et al. |
| 2012/0323972 A1 | 12/2012 | Ostrovsky |
| 2013/0332711 A1 | 12/2013 | Leidel et al. |
| 2014/0089635 A1 | 3/2014 | Shifer et al. |
| 2014/0136799 A1 | 5/2014 | Fortin |
| 2014/0164677 A1 | 6/2014 | Borchers et al. |
| 2014/0195784 A1 | 7/2014 | Ivanov |
| 2014/0281442 A1 | 9/2014 | O'sullivan et al. |
| 2014/0325126 A1 | 10/2014 | Choi et al. |
| 2014/0344236 A1* | 11/2014 | Xiao ............... G06F 16/2358 |
| | | 707/696 |
| 2015/0089173 A1 | 3/2015 | Chhabra et al. |
| 2015/0095600 A1 | 4/2015 | Bahnsen et al. |
| 2015/0106595 A1 | 4/2015 | Khot et al. |
| 2015/0143350 A1 | 5/2015 | Brewer |
| 2015/0178187 A1 | 6/2015 | Sheffler et al. |
| 2015/0188816 A1 | 7/2015 | Snyder, II et al. |
| 2015/0206561 A1 | 7/2015 | Brewer et al. |
| 2015/0278097 A1 | 10/2015 | Kelm et al. |
| 2015/0293835 A1 | 10/2015 | Park et al. |
| 2016/0283237 A1 | 9/2016 | Pardo et al. |
| 2017/0083257 A1 | 3/2017 | Jain et al. |
| 2017/0177365 A1 | 6/2017 | Doshi et al. |
| 2017/0185354 A1* | 6/2017 | Doshi ............... G06F 3/0659 |
| 2018/0173625 A1 | 6/2018 | Moudgill et al. |
| 2018/0203783 A1* | 7/2018 | Ishizaki ............... G06F 9/45516 |
| 2018/0357065 A1 | 12/2018 | Bhartia et al. |
| 2019/0004810 A1 | 1/2019 | Jayasimha et al. |
| 2019/0004851 A1 | 1/2019 | Doshi et al. |
| 2019/0042214 A1 | 2/2019 | Brewer |
| 2019/0065188 A1* | 2/2019 | Shippy ............... G06F 15/7825 |
| 2019/0171604 A1 | 6/2019 | Brewer |
| 2019/0243700 A1* | 8/2019 | Brewer ............... H04L 69/18 |
| 2019/0272119 A1 | 9/2019 | Brewer |
| 2019/0303154 A1 | 10/2019 | Brewer |
| 2019/0303328 A1* | 10/2019 | Balski ............... G06F 13/1684 |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2020/0026461 A1 | 1/2020 | Tune |
| 2020/0310684 A1 | 10/2020 | Fowler |
| 2021/0055964 A1 | 2/2021 | Brewer |
| 2021/0064374 A1 | 3/2021 | Brewer |
| 2021/0064435 A1 | 3/2021 | Brewer |
| 2021/0075633 A1* | 3/2021 | Sen ............... G06F 12/0813 |
| 2021/0149600 A1 | 5/2021 | Brewer |
| 2021/0326255 A1 | 10/2021 | Gu et al. |
| 2022/0121381 A1 | 4/2022 | Brewer |
| 2022/0121474 A1 | 4/2022 | Brewer |
| 2022/0121476 A1 | 4/2022 | Brewer |
| 2022/0121617 A1 | 4/2022 | Brewer |
| 2023/0004524 A1 | 1/2023 | Brewer |
| 2023/0027534 A1 | 1/2023 | Brewer |
| 2023/0195348 A1 | 6/2023 | Brewer |
| 2023/0205524 A1 | 6/2023 | Brewer |
| 2023/0251894 A1 | 8/2023 | Brewer |
| 2024/0311149 A1 | 9/2024 | Brewer |

FOREIGN PATENT DOCUMENTS

| | | |
|---|---|---|
| CN | 105359099 A | 2/2016 |
| CN | 105550126 A | 5/2016 |
| CN | 108027804 A | 5/2018 |
| CN | 110168500 A | 8/2019 |
| CN | 111656334 A | 9/2020 |
| CN | 111656335 A | 9/2020 |
| CN | 114385240 A | 4/2022 |
| CN | 114385241 A | 4/2022 |
| CN | 114388040 A | 4/2022 |
| CN | 114388040 B | 7/2023 |
| CN | 116547644 A | 8/2023 |
| CN | 116583831 A | 8/2023 |
| CN | 116601601 A | 8/2023 |
| EP | 0217168 A2 | 4/1987 |
| WO | WO-2010051167 A1 | 5/2010 |
| WO | WO-2010151813 A1 | 12/2010 |
| WO | WO-2013184380 A2 | 12/2013 |
| WO | WO-2019191740 A1 | 10/2019 |
| WO | WO-2019191742 A1 | 10/2019 |
| WO | WO-2019191744 A1 | 10/2019 |
| WO | WO-2019197811 A1 | 10/2019 |
| WO | WO-2019217287 A1 | 11/2019 |
| WO | WO-2019217295 A1 | 11/2019 |
| WO | WO-2019217324 A1 | 11/2019 |
| WO | WO-2019217326 A1 | 11/2019 |
| WO | WO-2019217329 A1 | 11/2019 |
| WO | WO-2019089816 A3 | 4/2020 |
| WO | WO-2022086789 A1 | 4/2022 |
| WO | WO-2022086791 A | 4/2022 |
| WO | WO-2022115166 A2 | 6/2022 |
| WO | WO-2022115166 A3 | 9/2022 |

OTHER PUBLICATIONS

"Chinese Application Serial No. 202111222969.X, Voluntary Amendment filed Aug. 11, 2022", with English claims, 18 pages.
"Chinese Application Serial No. 202111215429.9, Decision of Rejection mailed Mar. 25, 2023", with WIPO machine English translation, 17 pages.
"Chinese Application Serial No. 202111215429.9, Office Action mailed Oct. 26, 2022", with English translation, 16 pages.
"Chinese Application Serial No. 202111222969.X, Office Action mailed Nov. 22, 2022", with English translation, 9 pages.

(56) References Cited

OTHER PUBLICATIONS

"International Application Serial No. PCT/US2021/053792, International Search Report mailed Jul. 28, 2022", 4 pgs.
"International Application Serial No. PCT/US2021/053792, Written Opinion mailed Jul. 28, 2022", 4 pgs.
"International Application Serial No. PCT/US2021/055038, International Search Report mailed Jan. 28, 2022", 3 pgs.
"International Application Serial No. PCT/US2021/055038, Written Opinion mailed Jan. 28, 2022", 3 pgs.
"International Application Serial No. PCT/US2021/055050, International Search Report mailed Feb. 3, 2022", 3 pgs.
"International Application Serial No. PCT/US2021/055050, Written Opinion mailed Feb. 3, 2022", 3 pgs.
Hennessy, John L, et al., "Computer Architecture—A Quantitative Approach (4th Edition)", Elsevier, <https://app.knovel.eom/hotlink/toc/id:kpCAAQAE02/computer-architecture/computer-architecture>, (2007), 107 pgs.
Wang, H, et al., "An Enhanced HyperTransport Controller with Cache Coherence Support for Multiple-CMP", 2009 IEEE International Conference on Networking, Architecture, and Storage, doi: 10.1109/NAS.2009.46, (2009), 215-218.
"International Application Serial No. PCT/US2021/053792, International Preliminary Report on Patentability mailed May 4, 2023", 6 pgs.
"International Application Serial No. PCT/US2021/055038, International Preliminary Report on Patentability mailed May 4, 2023", 5 pgs.
"International Application Serial No. PCT/US2021/055050, International Preliminary Report on Patentability mailed May 4, 2023", 5 pgs.
"Chinese Application Serial No. 202111224820.5, Office Action mailed Aug. 14, 2024", with English translation, 12 pages.

\* cited by examiner

| CP | PATH (TIDL) | | DID | S C | LEN | CMD | 0 |
|---|---|---|---|---|---|---|---|
| TU | CA TRAP | | CAPC | | BTYPE | EXCMD | 8 |
| CR/RSV | CAU STATE <31:0> | | | | | | |
| CR/RSV | CAU STATE <63:32> | | | | | | 16 |
| CR/RSV | CAU STATE <95:64> | | | | | | 24 |
| CR/RSV | CAU STATE <127:96> | | | | | | 32 |
| | | | | | | | 36 |

FIG. 6

METHOD OF NOTIFYING A PROCESS OR PROGRAMMABLE ATOMIC OPERATION TRAPS

PRIORITY APPLICATION

This application is a continuation of U.S. application Ser. No. 17/901,480, filed Sep. 1, 2022, which is a continuation of U.S. application Ser. No. 17/074,779, filed Oct. 20, 2020, now issued as U.S. Pat. No. 11,436,187, all of which are incorporated herein by reference in their entirety.

STATEMENT REGARDING GOVERNMENT SUPPORT

This invention was made with U.S. Government support under Agreement No. HR00111890003, awarded by DARPA. The U.S. Government has certain rights in the invention.

BACKGROUND

Chiplets are an emerging technique for integrating various processing functionalities. Generally, a chiplet system is made up of discreet modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits, or "chips" (ICs), potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 illustrates a programmable atomic trap response according to some examples of the present disclosure.

DETAILED DESCRIPTION

Figure 1A:
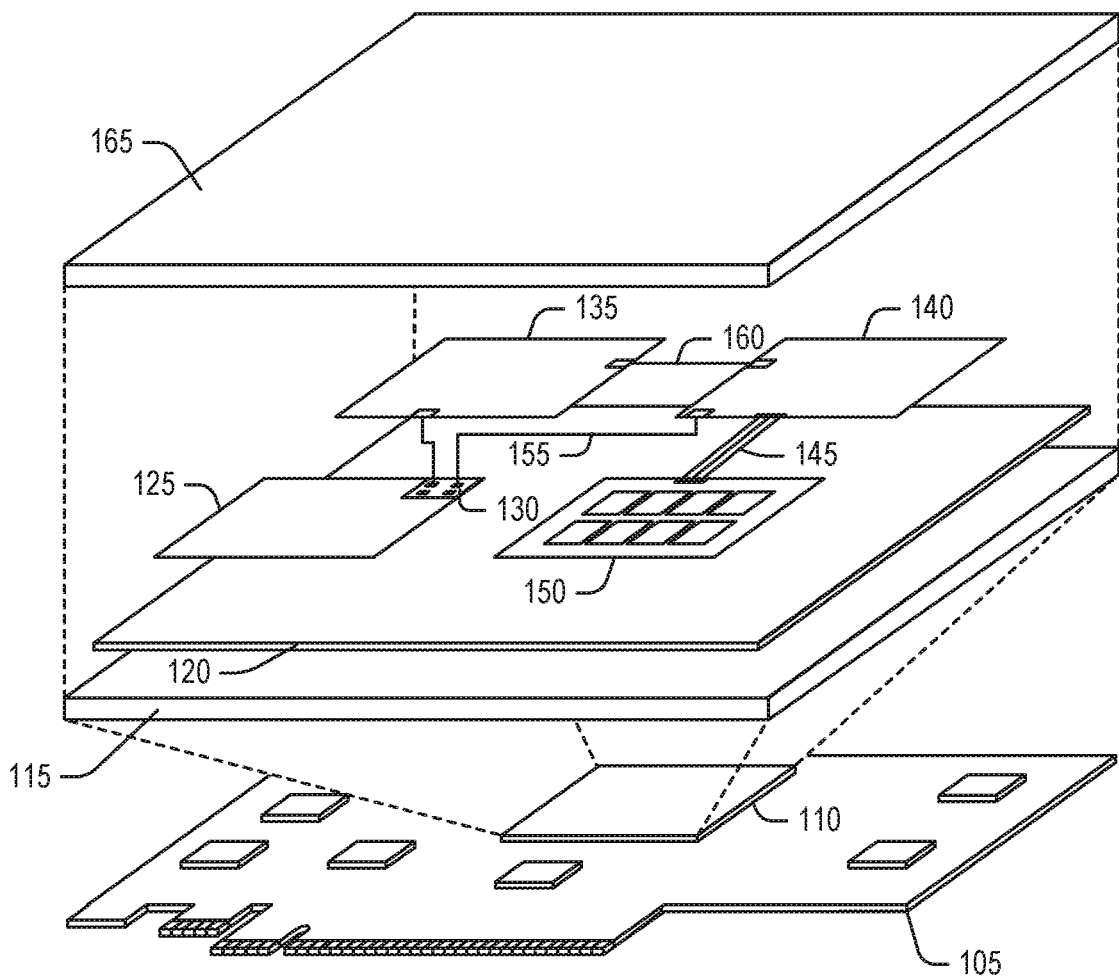
FIGS. 1A and 1B illustrate an example of a chiplet system, according to an embodiment.

FIG. 1, described below, offers an example of a chiplet system and the components operating therein. As explained below, such chiplet systems may include a memory controller that has programmable atomic units that execute programmable atomic transactions that comprise one or more instructions. A programmable atomic may be requested by a different processor (e.g., such as by a process on a different chiplet) via a request packet sent to the memory controller through a chiplet communication mechanism. The programmable atomic transaction is executed at a programmable atomic unit of a memory controller as a memory operation. If the programmable atomic transaction successfully completes, the programmable atomic unit may send a response to the calling processor.

A programmable atomic transaction may also terminate due to an exception condition such as a memory request address bound check failure, instruction execution limit, and the like. For personal computers, such as for an x86 architecture, when an instruction triggers an exception the processor triggers an interrupt which is handled by an operating system that then may terminate the process that caused the exception. The operating system knows which process caused the exception as it manages which process runs at any given time.

In other systems, for example those using programmable atomic transactions, the programmable atomic unit is called by a process by issuing a RISC instruction. The RISC instruction is executed by a local processor which sends a request over the chiplet network to the memory controller that then executes the transaction in the physical memory space of the programmable atomic unit. As a result, the programmable atomic unit does not know which process it is executing for. When an exception is encountered the offending process should be terminated to avoid memory faults that may cause undesired operation. However, without knowledge of which process was at fault, the memory controller is not in a position to do this. One solution would be to raise a flag in the memory controller and an operating system would periodically poll the flag and figure out which process caused the flag. This is undesirable and creates a lot of overhead for the O/S as it would have to constantly check the flag. Moreover, if the O/S were on a different processor, this would create overhead for the communications interface to the memory controller.

Disclosed in some examples, are methods, systems, programmable atomic units, and machine-readable mediums that provide an exception as a response to the calling processor. That is, the programmable atomic unit will send a response to the calling processor. The calling processor will recognize that the exception has been raised and will handle the exception. Because the calling processor knows which process triggered the exception, the calling processor (e.g., the Operating System) can take appropriate action, such as terminating the calling process. The calling processor may be a same processor as that executing the programmable atomic transaction, or a different processor (e.g., on a different chiplet). The ability to send an exception back to the issuing processor allows the system to trap at the point in the executing application where the PAU operation was issued. This allows a programming using a debugger to determine which PAU operation trapped, why it trapped and what the input parameters that caused the exception.

Figure 1B:
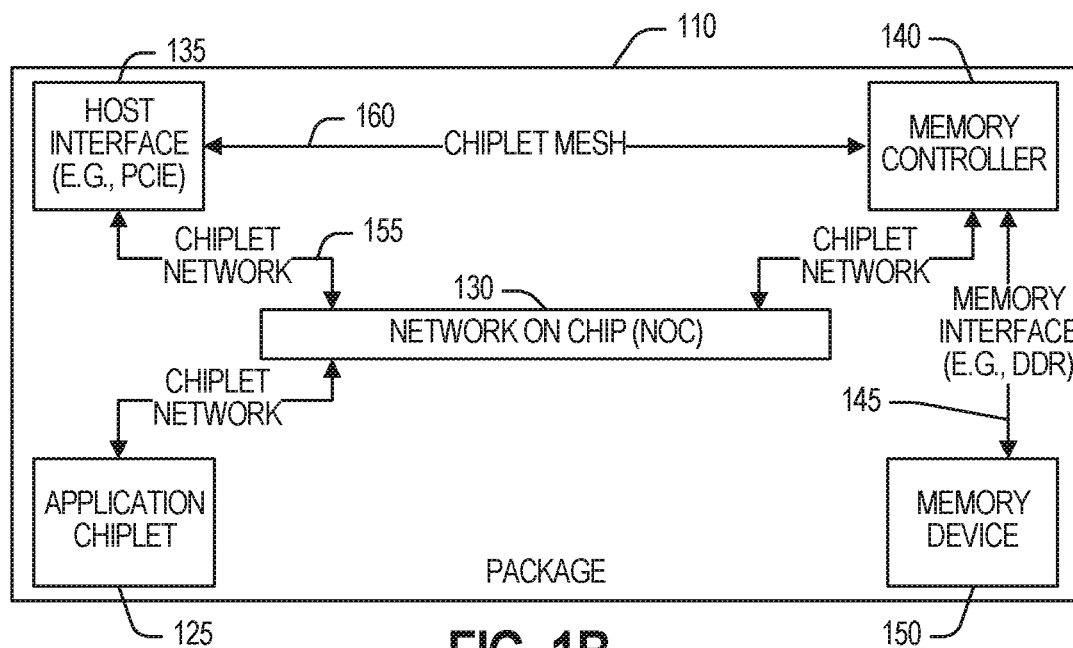

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB primary or secondary depending on which chiplet provides the master clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic transactions are one or more data manipulation operations that, for example, may be performed by the memory controller chiplet 140. In other chiplet systems, the atomic transactions may be performed by other chiplets. For example, an atomic transaction of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic transactions avoid transmitting the data across the chiplet mesh network 160, resulting in lower latency execution of such commands.

Atomic transactions can be classified as built-in atomics or programmable (e.g., custom) atomic transactions. Built-in atomic transactions are a finite set of operations that are immutably implemented in hardware. Programmable atomic transactions are small programs with one or more instructions (e.g., an instruction set) that may execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
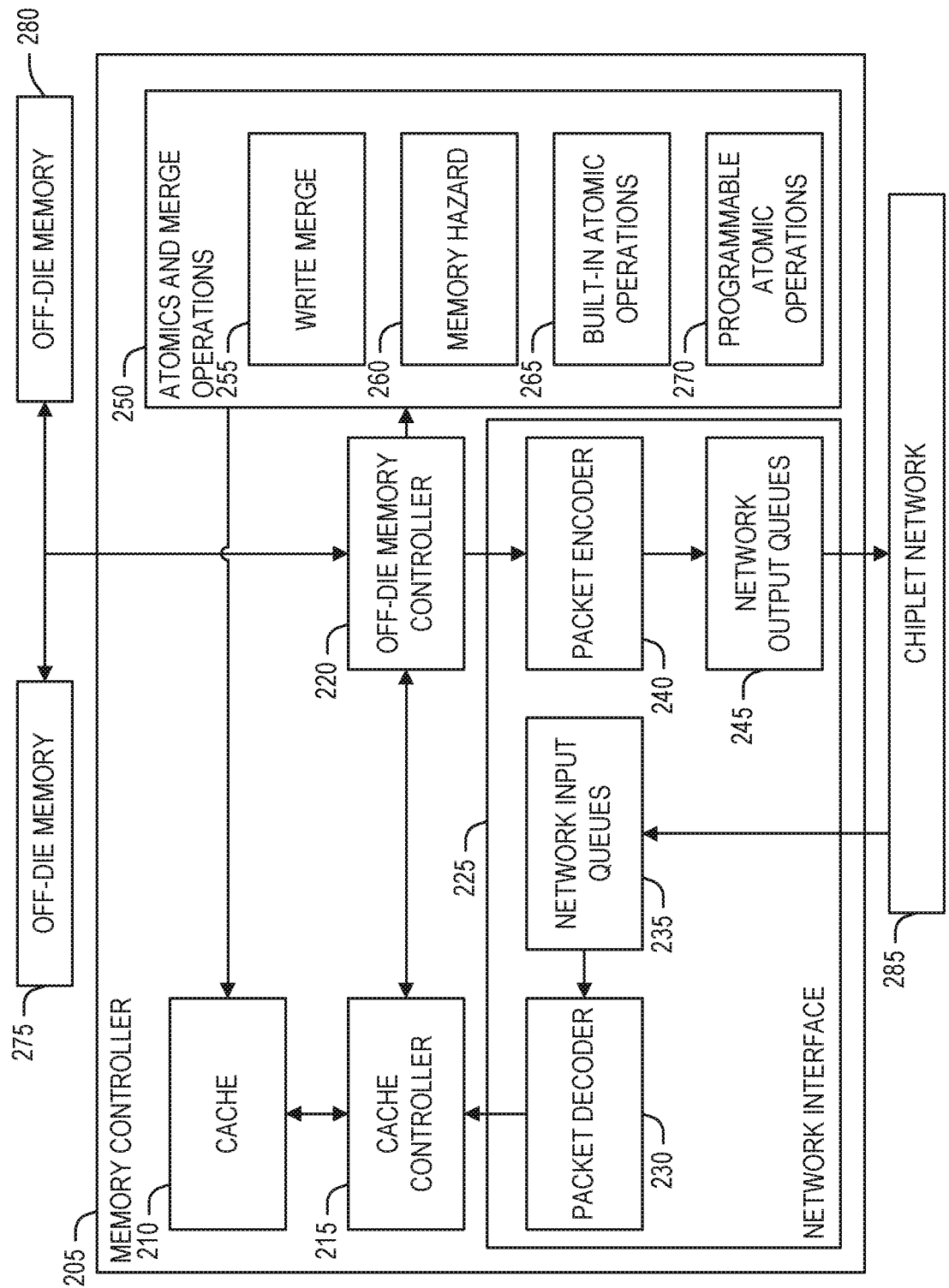
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge unit 250. Members of this set can include, for example, a write merge unit 255, a memory hazard unit 260, built-in atomic unit 265 (for performing built in atomic transactions), or a programmable atomic unit (PAU) 270 (for performing programmable atomic transactions). The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. lithe request cannot be handled by the cache controller 215, the off-die memory controller 220 handles the request by communication with the off-die memories 275 or 280, the atomic and merge unit 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

Figure 3:
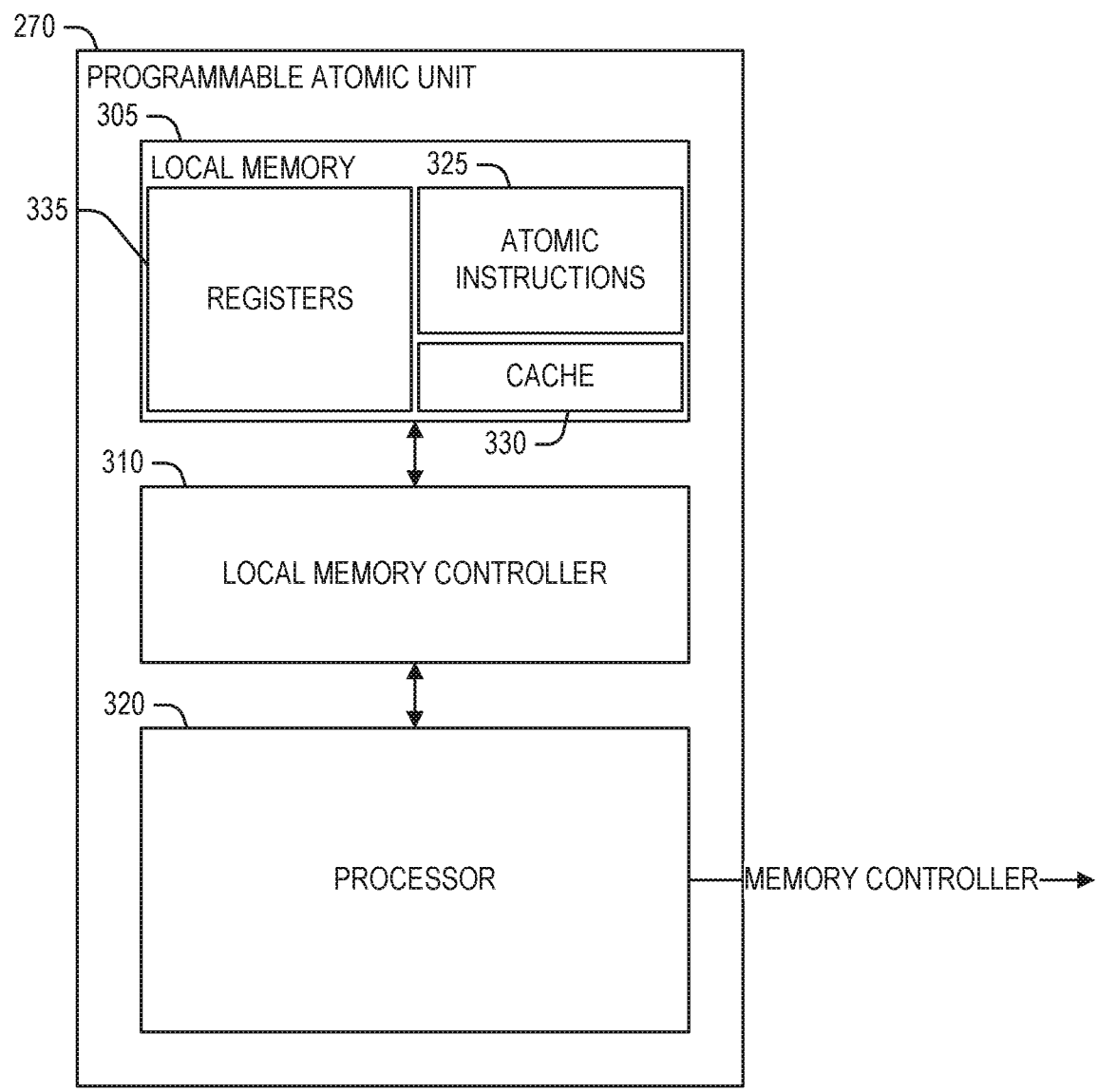
FIG. 3 illustrates components in an example of a programmable atomic unit (PAU), according to an embodiment.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor. An example PAU 270 is shown in FIG. 3.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic unit 265 receives the request and reads data, either from the write merge unit 255 or directly from the off-die memory controller 220. The atomic transaction is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic transactions such as fetch-and-increment or compare-and-swap. In an example, these transactions perform a simple read-modify-write operation to a single memory location of 32-bytes or less in size. Atomic memory transactions are initiated from a request packet transmitted over the chiplet network 285. The request packet has a physical address, atomic operator type, operand size, and optionally up to 32-bytes of data. The atomic transaction performs the read-modify-write to a cache memory line of the cache 210, filling the cache memory if necessary. The atomic transaction response can be a simple completion response, or a response with up to 32-bytes of data. Example atomic memory transactions include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic transactions can also involve requests for a "standard" atomic standard on the requested data, such as comparatively simple, single cycle, integer atomics—such as fetch-and-increment or compare-and-swap—which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic unit 265 to perform the requested atomic transaction. Following the atomic transaction, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic transactions (also referred to as "custom atomic transactions" or "custom atomic operations"), comparable to the performance of built-in atomic transactions. Rather than executing multiple memory accesses, in response to an atomic transaction request designating a programmable atomic transaction and a memory address, circuitry in the memory controller chiplet 205 transfers the atomic transaction request to PAU 270 and sets a hazard bit stored in a memory hazard register corresponding to the memory address of the memory line used in the atomic operation, to ensure that no other operation (read, write, or atomic transaction) is performed on that memory line, which hazard bit is then cleared upon completion of the atomic transaction. Additional, direct data paths provided for the PAU 270 executing the programmable atomic transactions allow for additional write operations without any limitations imposed by the bandwidth of the communication networks and without increasing any congestion of the communication networks.

The PAU 270 includes a multi-threaded processor 320, for example, such as a RISC-V ISA based multi-threaded processor, having one or more processor cores, and further having an extended instruction set for executing programmable atomic transactions. When provided with the extended instruction set for executing programmable atomic transactions, the processor 320 of PAU 270 can be embodied as one or more hybrid threading processors. In some example embodiments, the processor 320 of PAU 270 provides barrel-style, round-robin instantaneous thread switching to maintain a high instruction-per-clock rate.

PAU 270 may include a local memory 305, such as Static Random-Access Memory (SRAM), NAND, phase change memory, or the like. The local memory 305 may include registers 335, instruction memory 325, and cache 330. The local memory 305 may be accessible to the processor 320 through a memory controller 310.

Programmable atomic transactions can be performed by the PAU 270 involving requests for programmable atomic transactions on the requested data. A user can prepare programming code in the form of one or more instructions to provide such programmable atomic transactions. For example, the programmable atomic transactions can be comparatively simple, multi-cycle operations such as floating-point addition, or comparatively complex, multi-instruction operations such as a Bloom filter insert. The programmable atomic transactions can be the same as or different than the predetermined atomic transactions, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic transaction. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic transactions is to provide multiple, generic, programmable atomic request types that can be sent through the chiplet network 285 to the memory controller chiplet 205 from an originating source such as a processor or other system component. The cache controllers 215 or off-die memory controller 220 identify the request as a programmable atomic transaction and forward the request to the PAU 270. In a representative embodiment, the PAU 270: (1) is a programmable processing element capable of efficiently performing a user defined atomic transaction; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined transaction. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard unit 260. Accordingly, when the request and read data is received by the write merge unit 255, a reset or clear signal can be transmitted by the memory hazard unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

FIG. 3 illustrates a block diagram of a programmable atomic unit 270 according to some examples of the present disclosure. As previously described, programmable atomic units may include one or more programmable atomic transactions that are specified by sets of one or more atomic instructions stored in instruction memory 325 that are custom defined and perform operations on memory managed by the memory controller. The instructions of atomic transactions may be specified by applications and/or processes outside the programmable atomic unit 270 that may reside on the memory controller chiplet 205, other chiplets (such as application chiplet 125), or an off chiplet-device. In some examples, the instructions of the programmable atomic transaction are loaded by the operating system when registered by a process. To execute the programmable atomic transaction, the initiating process sends a CPI message including an instruction to execute the requested programmable atomic transaction on the local memory 305 of the programmable atomic unit 270 by providing an index into the local memory of the programmable atomic unit 270. The programmable atomic transactions may utilize cache 330, registers 335, and other memory of local memory 305 during execution. Local memory controller 310 may manage the local memory 305. In some examples, programmable atomic unit 270 may not need the local memory controller as the local memory 305 may be SRAM.

Figure 4:
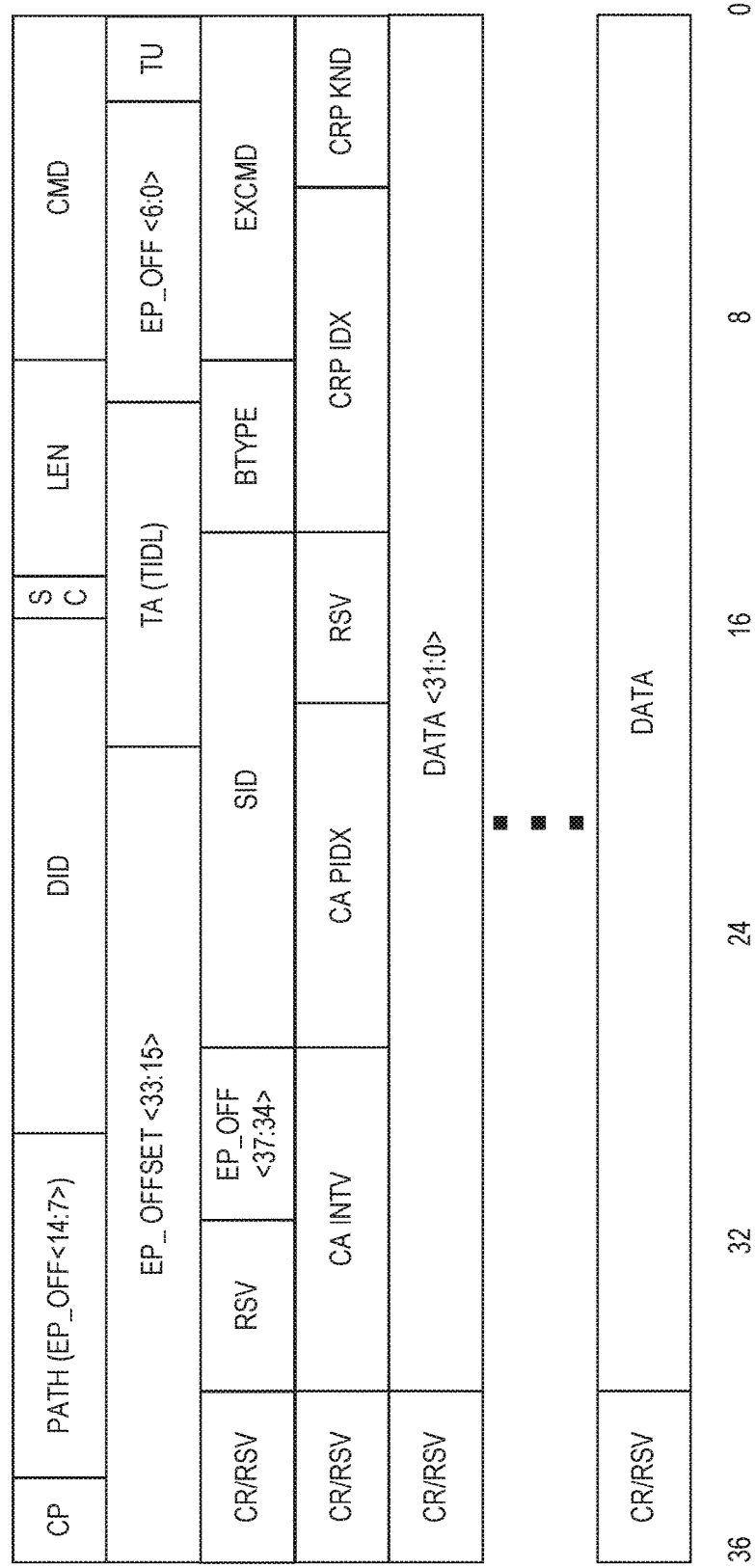
FIG. 4 illustrates a request packet for requesting execution of a particular programmable atomic according to some examples of the present disclosure.

When requesting execution of a particular programmable atomic transaction, a requesting processor may send a CPI request packet indicating the particular memory location (e.g., partition(s) within local memory 305) within the programmable atomic unit which contain the previously loaded programmable atomic instructions to execute, a location of the memory managed by the memory controller chiplet 205 (e.g., off-die memory 275, 280) that is to be operated upon, and one or more arguments. The processor of the programmable atomic unit(e.g., processor 320) then begins executing the instructions at the indicated partition. FIG. 4 illustrates a request packet for requesting execution of a particular programmable atomic transaction. The fields are described as:

| Field Name | Field Width | Value | Description |
|---|---|---|---|
| CMD | 8 | 126 | Extended VC1 |
| LEN | 5 | | Packet Length |
| SC | 1 | 0 | Sequence Continue (ignored for EMD) |
| DID | 12 | | Destination NOC endpoint |
| PATH | 8 | | Endpoint Offset <14:7> |
| CP | 2 | 1 | Credit/Path Order - Credit Return enabled in flits 3-N and Path field based path ordering |
| TU | 2 | | Transaction ID <9:8> |
| EpOFF<6:0> | 7 | | Endpoint Offset <6:0> |
| TA | 8 | | Transaction ID <7:0> |
| EPOffset<33:15> | 19 | | Endpoint Offset <33:15> |
| EXCMD | 8 | | Extended Command |
| BTYPE | 4 | 8 | BTYPE of 8 is EMD vendor defined |
| SID | 12 | | Source NOC endpoint |
| EPOFFSET <37:34> | 4 | | Endpoint Offset <37:34> |
| RSV | 4 | 0 | Reserved |
| CR/RSV | 4 | | Credit Return |
| CrPKnd | 4 | | Credit pool kind |
| CrPIdx | 8 | | Credit Pool Index |
| RSV | 4 | 0 | Reserved |
| CaPIdx | 8 | | Custom Atomic Partition Index |
| CaIntv | 8 | | Interleave Size |
| CR/RSV | 4 | | Credit Return |
| DATA | 32 | | Argument Data: 0, 1, 2, or 4 64 Bit Values |
| CR/RSV | 4 | | Credit Return |

A programmable atomic transaction begins by executing the first instruction located at the partition in the instruction RAM (e.g., local memory 305 of programmable atomic unit 270) of the programmable atomic transaction specified by the Custom Atomic Partition Index (CaPIdx). The operation starts at the first instruction within the partition. The CaPIdx may also be used to index into a control structure that contains additional information for the operation. The additional information includes a flag to indicate whether the transaction is valid, the number of partitions for the transaction and the instruction execution limit.

Figure 5:
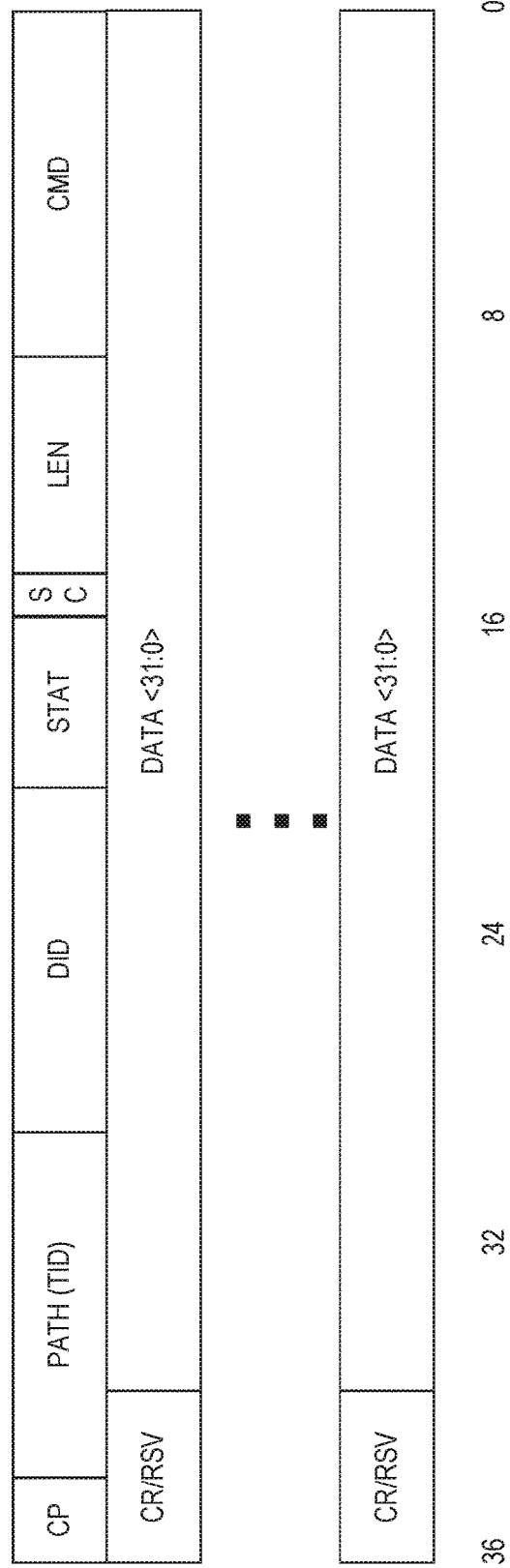
FIG. 5 illustrates a programmable atomic response message according to some examples of the present disclosure.

The programmable atomic unit continues executing instructions until a termination instruction is reached or an exception occurs. On reaching a termination instruction where no exception occurred a normal response is sent to the requestor processor. A normal response to the programmable atomic transaction is provided as a memory response. For example, FIG. 5 illustrates the response message. The fields of the response message are as follows:

| Field Name | Field Width | Description |
|---|---|---|
| CMD | 8 | Packet command |
| LEN | 5 | Encoded Packet Length |
| SC | 1 | Sequence Continue. When set, this packet is part of a multi-packet transfer and this packet is not the last packet in the sequence. This bit is present in the first flit of all packet types |

-continued

| Field Name | Field Width | Description |
|---|---|---|
| DID | 8 | Destination Endpoint ID bits 7:0 - destination fabric endpoint |
| STAT | 4 | Response Status |
| Path | 8 | The Path field is used to specify a path through a CPI fabric to force ordering between packets. For both CPI native and AXI over CPI the read response packet's PATH field contains the TID value |
| CP | 2 | Credit Present/Path Ordering. The CP field contains an encoded value that specifies both if field CR of flits 3-N of the packet contains credit return information as well as whether path ordering is enabled. |
| Data | 32 | Read response data - bits N*8-1:0 |
| CR/RSV | 4 | Credit Return Information |
| RSV | 4 | Reserved |

An exception occurs if either the specified number of instructions (the instruction execution limit) is reached or an operation in the transaction is executing which lies outside the appropriate partitions, as determined by the number of partitions and the starting partition. That is, if the next instruction lies within a partition with a partition index that is after the sum of the starting partition index and the number of partitions (provided in the control structure indexed by the CaPIdx), an exception is thrown. An exception causes the executing programmable atomic transaction to cease, and a termination instruction to be executed automatically by the programmable atomic unit that releases any locks, cleans up the transaction, and provides a response to the caller.

As noted above, the programmable atomic unit is unaware of the process it is executing for and so the exception may be handled by sending a response to the calling processor indicating that the programmable atomic transaction terminated due to an exception. The calling processor is indicated in the source field in the request packet of the programmable atomic transaction. The requesting processor that called the programmable atomic may receive this response, and then perform the appropriate error handling, such as calling an operating system to handle the error.

Disclosed in some examples, are methods, systems, devices, and machine-readable mediums that provide notification of an exception condition of a programmable atomic transaction by first having the programmable atomic unit send a completion response to the requesting processor, and then having the requesting processor handle the fault (e.g., by informing the operating system through an exception or trap). This allows the request for the programmable atomic operation to have the minimal information needed to initiate the programmable atomic transaction while still providing proper exception handling. This also simplifies the programmable atomic unit in the memory controller as it does not directly interact with the system's operating system. The ability to send an exception back to the issuing processor allows the system to trap at the point in the executing application where the PAU operation was issued. This allows a programming using a debugger to determine which PAU operation trapped, why it trapped and what the input parameters that caused the exception.

When a programmable atomic unit detects an exception condition in an executing programmable atomic transaction, it terminates the offending operation and forces the execution of an atomic return instruction (EAR). The EAR instruction responds back to the processor that made the original programmable atomic request with a memory response that has a status field indicating the cause of the exception and up to 16 bytes of programmable atomic state used for debugging the cause of the exception.

FIG. 6 illustrates a programmable atomic trap response according to some examples of the present disclosure. The trap response is sent in VC1 using a vendor defined extended header CPI packet. The fields are defined as:

| Name | Field Width | Value | Field Description |
|---|---|---|---|
| CMD | 8 | 126 | Extended VC1 |
| LEN | 5 | 3 | Packet Length |
| SC | 1 | 0 | Sequential Continue (Ignored by EMD) |
| DID | 12 | | Destination NOC Endpoint |
| Path | 8 | | Transaction ID <7:0> |
| CP | 2 | 0 | Credit/Path Order - Credit Return enabled in flits 3-N and Path Field Ignored |
| EXCMD | 8 | 224 | |
| BTYPE | 4 | 8 | BTYPE of 8 is EMD vendor defined |
| CaPC | 16 | | Custom Atomic Program Counter at Point of Trap |
| CaTrap | 6 | | Custom Atomic Trap Type |
| TU | 2 | | Transaction ID <9:8> |
| CauState <31:0> | 32 | | Custom Atomic State for debugging |
| CR/RSV | 4 | | Credit Return |
| CauState <62:32> | 32 | | Custom Atomic state for debugging |
| CR/RSV | 4 | | Credit Return |
| CauState<127:96> | 32 | | Custom Atomic State for Debugging |
| Cr/RSV | 4 | | Credit Return |

Figure 7:
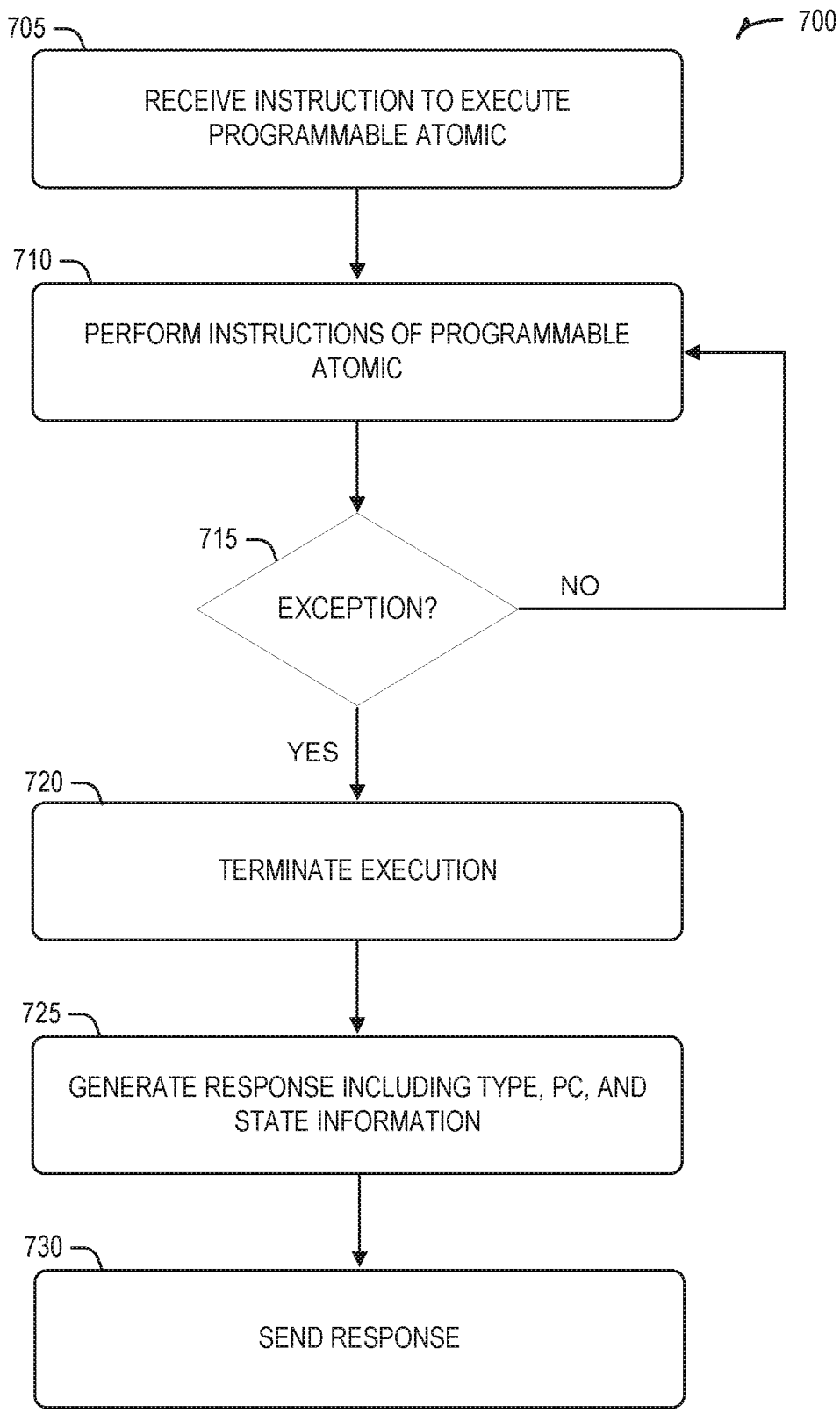
FIG. 7 illustrates a flowchart of a method of a programmable atomic unit providing a notification to a calling processor that the programmable atomic ended with an exception according to some examples of the present disclosure.

FIG. 7 illustrates a flowchart of a method 700 of a programmable atomic unit providing a notification to a calling processor that the programmable atomic transaction ended with an exception according to some examples of the present disclosure. At operation 705, the programmable atomic unit may receive an instruction to execute a programmable atomic transaction. As previously described the instruction may specify one of a plurality of programmable atomic instruction sets that are stored within the memory of the programmable atomic unit. The instruction may specify the particular programmable atomic transaction based upon a memory partition identifier as previously described. The request may be received from a process running on the memory controller (e.g., memory controller 205; 140) or from a process running on another chiplet, such as application chiplet 125.

At operation 710, the programmable atomic unit may perform the instructions of the programmable atomic transaction. Such instructions may include reading values from memory cells (e.g., off-die memory 275, 280) controlled by the memory controller of which the programmable atomic unit 270 is a part of. Such instructions may perform operations to the value read from the memory and may store modified values back to the memory (e.g., off-die memory 275, 280). Such operations provide reduced latency to processes that call the PAU.

Operations continue to be executed until the programmable atomic completes, unless an exception is detected at operation 715. If an exception is detected, at operation 720, the execution of the programmable atomic is terminated. At operation 725, the programmable atomic unit generate a response message including the type of exception, the program counter (PC) (the instruction pointer), and state information, such as memory dump information. The response may be formatted such as shown in FIG. 6. At operation 730, the response may be sent to the calling processor using the return address of the processor that called the programmable atomic at operation 705.

Figure 8:
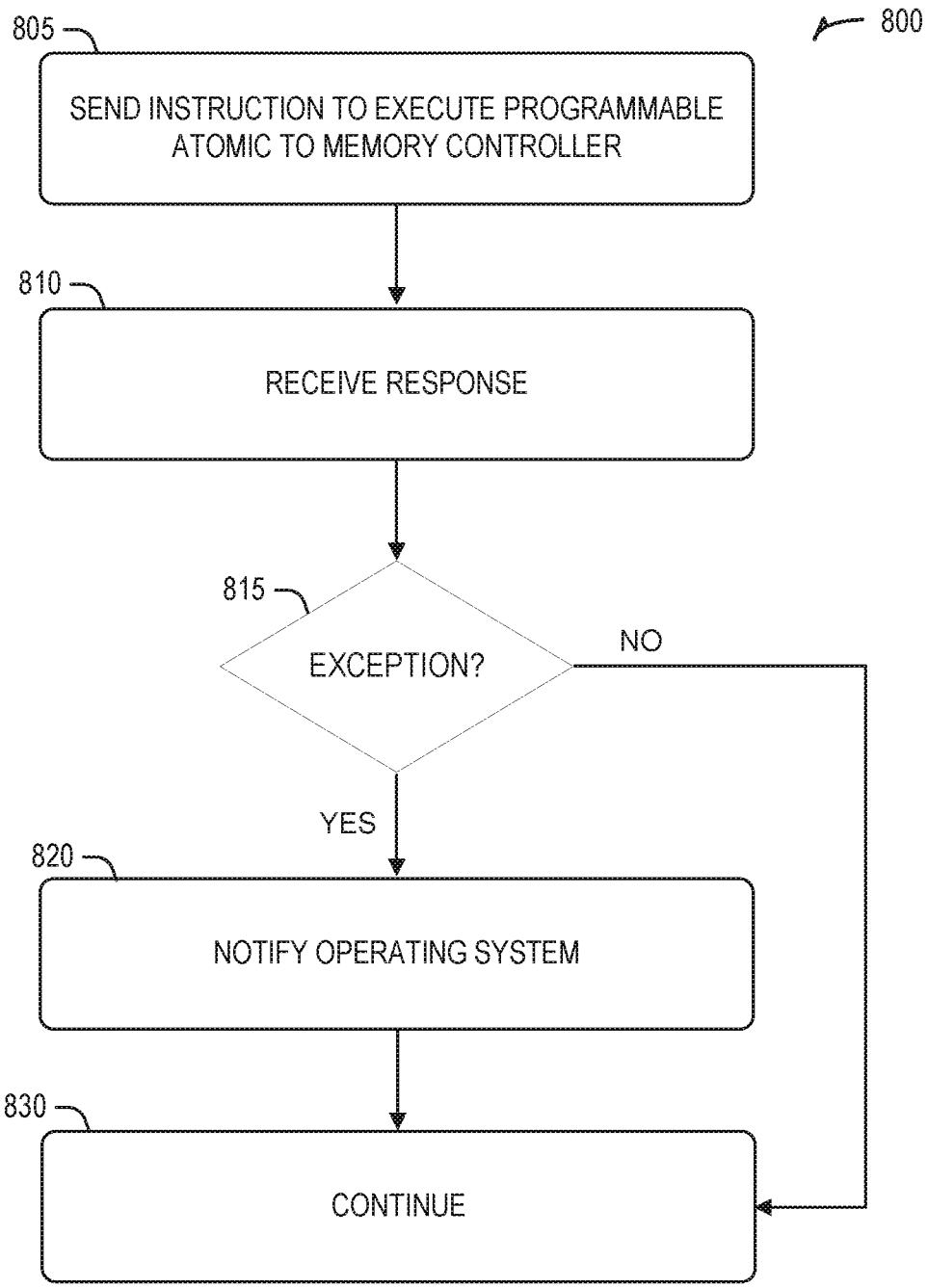
FIG. 8 illustrates a flowchart of a method of a calling processor notifying an operating system according to some examples of the present disclosure.

FIG. 8 illustrates a flowchart of a method 800 of a calling processor notifying an operating system according to some examples of the present disclosure. Method 800 may be performed by a processor executing on the memory controller 140, a host interface 135, an application chiplet 125, or the like. At operation 805 the processor sends the instruction to execute a programmable atomic transaction to the programmable atomic unit of the memory controller (e.g., memory controller 140). For example, a message such as shown in FIG. 4. At operation 810, the processor receives a response from the programmable atomic unit. The response is checked at operation 815 to determine if the programmable atomic transaction ended successfully or with an exception. If the programmable atomic transaction ended with an exception at operation 815, then at operation 820, the processor may notify an operating system of the exception. For example, by triggering an exception, fault, or otherwise passing a message to an operating system executing on the application chiplet 125, an operating system executing on a computer system in which a peripheral board 105 is inserted, or the like. At operation 830, the processor may continue with its operations—for example, by applying one or more error handling conditions.

Figure 9:
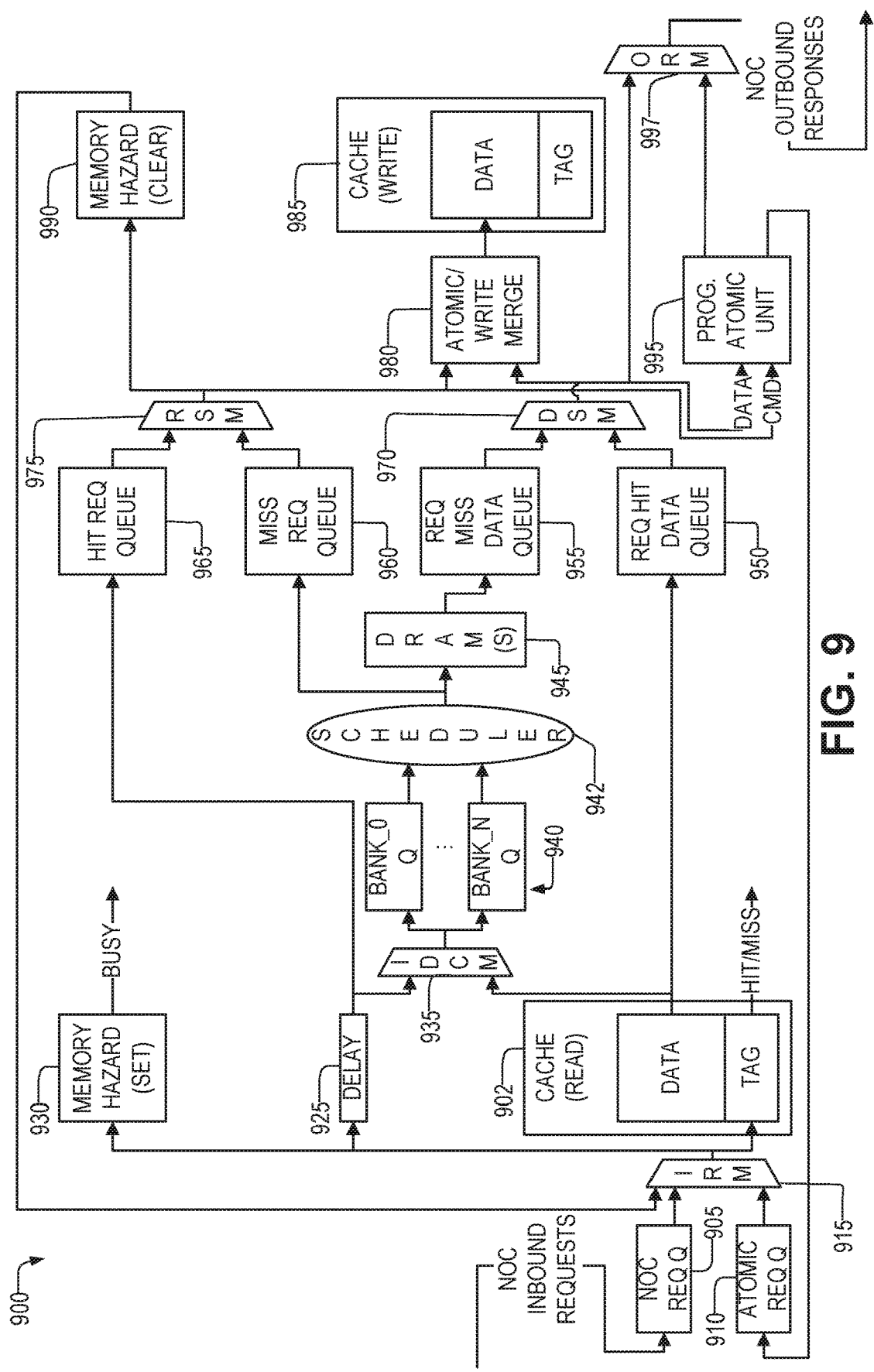
FIG. 9 illustrates a block diagram of a memory controller according to some examples of the present disclosure.

FIG. 9 illustrates a block diagram of a memory controller 900 according to some examples of the present disclosure. FIG. 9 is another example of a memory controller 205 and shows many of the same components as shown in FIG. 2. For example, the cache 902 and 985 are examples of cache 210; DRAM(s) 945 are examples of off-die memory 275-280; atomic/write merge 980 and the programmable atomic unit 995 may be an example of atomics and merge unit 250; other components of FIG. 8 may be examples of other components of FIG. 2 such as off-die memory controller 220 and cache controller 215.

NOC Request Queue 905 receives requests from the network-on-chip and provides a small amount of queuing. Atomic Request Queue 910 receives requests from the programmable atomic unit and provides a small amount of queuing. Inbound Request Multiplexer (IRM) 915 selects between inbound memory request sources. The three sources, in order of priority are: Memory Hazard Requests, Atomic Requests, and Inbound NOC Requests. Cache (Read) 902 and Cache (Write) 985 is an SRAM data cache. The diagram shows the cache as two separate blocks (902 and 985), one providing read access, the other providing write access. Delay Block 925 provides one or more pipeline stages to mimic the delay for an SRAM cache read operation. A cache miss requires access to memory to bring the desired data into the cache. During this DRAM access time, the memory line is not available for other requests. The Memory Hazard block (Set block 930 and Clear block 990) maintains a table of hazard bits indicating which memory lines are unavailable for access. An inbound request that tries to access a line with a hazard is held by the Memory Hazard block until the hazard is cleared. Once the hazard is cleared then the request is resent through the Inbound Request Multiplexer. The memory line tag address is hashed to a hazard bit index. The number of hazard bits may be chosen to set the hazard collision probability to a sufficiently low level. Inbound DRAM Control Multiplexer (IDCM) 935 selects from an inbound NOC request and a cache eviction request. Bank Request Queues 940—each separately managed DRAM bank has a dedicated bank request queue to hold requests until they can be scheduled on the associated DRAM bank.

Scheduler 942 selects across the bank request queues 940 to choose a request for an available DRAM bank. The DRAM(s) 945 represents the external DRAM device or devices. Request Hit Data Queue 950 holds request data from cache hits until selected. Request Miss Data Queue 955 holds data read from the DRAM(s) until selected. Miss Request Queue 960 is used to hold request packet information for cache misses until the request is selected. Hit Request Queue 965 holds request packet information for cache hits until selected. Data Selection Multiplexer (DSM) 970 selects between DRAM read data and cache hit read data. The selected data is written to the SRAM cache. Request Selection Multiplexer (RSM) 975 selects between hit and miss request queues 960 and 965.

Atomic/Write Merge 980 either merges the request data and DRAM read data, or, if the request is a built-in atomic, the memory data and request data are used as inputs for an atomic operation. Cache (Write) block 985 represents the write port for the SRAM cache. Data from a NOC write request and data from DRAM read operations are written to the SRAM cache. Memory Hazard (Clear) block 990 represents the hazard clear operation for the memory hazard structure. Clearing a hazard may release a pending NOC request and send it to the Inbound Request Multiplexer. Programmable Atomic Unit 995 processes programmable atomic transactions. NOC Outbound Response Multiplexer (ORM) 997 selects between memory controller responses and custom atomic unit responses and sends the selection to the NOC.

Figure 10:
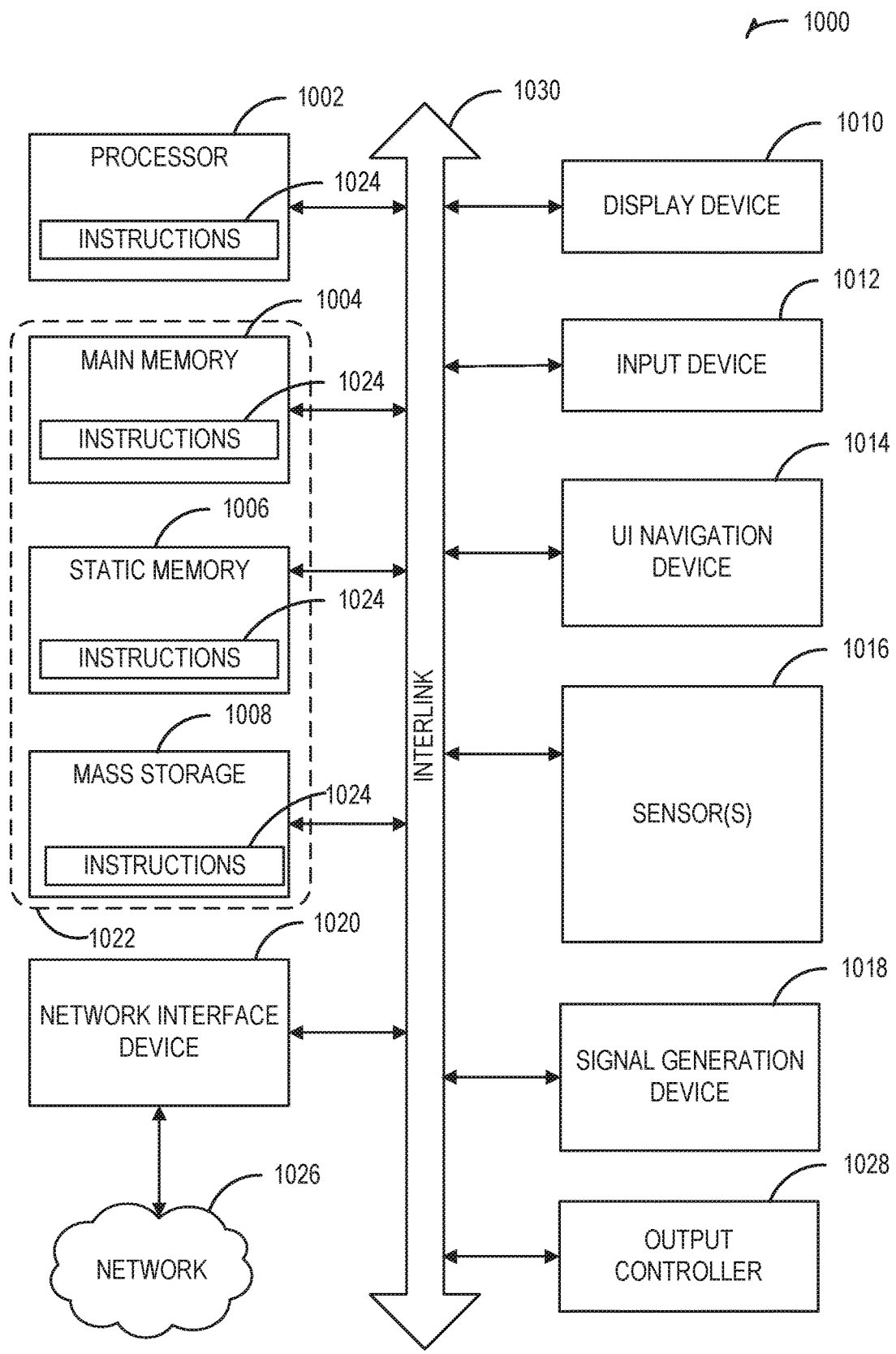
FIG. 10 is a block diagram of an example of a machine with which, in which, or by which embodiments of the present disclosure can operate.

FIG. 10 illustrates a block diagram of an example machine 1000 with which, in which, or by which any one or more of the techniques (e.g., methodologies) discussed herein can be implemented. Examples, as described herein, can include, or can operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 can operate as a standalone device or can be connected (e.g., networked) to other machines. In a networked deployment, the machine 1000 can operate in the capacity of a server machine, a client machine, or both in server-client network environments. In an example, the machine 1000 can act as a peer machine in peer-to-peer (P2P) (or other distributed) network environment. The machine 1000 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 can include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which can communicate with each other via an interlink (e.g., bus) 1030. The machine 1000 can further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 can be a touch screen display. The machine 1000 can additionally include a mass storage (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 can include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 can be, or include, a machine readable medium 1022 on which is stored one or more sets of data structures or instructions 1024 (e.g., software) embodying or utilized by any one or more of the techniques or functions described herein. The instructions 1024 can also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 can constitute the machine readable media 1022. While the machine readable medium 1022 is illustrated as a single medium, the term "machine readable medium" can include a single medium or multiple media (e.g., a centralized or distributed database, or associated caches and servers) configured to store the one or more instructions 1024.

The term "machine readable medium" can include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 can be representative of the instructions 1024, such as instructions 1024 themselves or a format from which the instructions 1024 can be derived. This format from which the instructions 1024 can be derived can include source code, encoded instructions (e.g., in compressed or encrypted form), packaged instructions (e.g., split into multiple packages), or the like. The information representative of the instructions 1024 in the machine readable medium 1022 can be processed by processing circuitry into the instructions to implement any of the operations discussed herein. For example, deriving the instructions 1024 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 can include assembly, compilation, or interpretation of the information (e.g., by the processing circuitry) to create the instructions 1024 from some intermediate or preprocessed format provided by the machine readable medium 1022. The information, when provided in multiple parts, can be combined, unpacked, and modified to create the instructions 1024. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 can be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 can include one or more physical jacks (e.g., Ethernet, coaxial, or phone jacks) or one or more antennas to connect to the communications network 1026. In an example, the network interface device 1020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

OTHER NOTES AND EXAMPLES

Example 1 is an apparatus comprising: a memory controller; a programmable atomic unit coupled to the memory controller, the programmable atomic unit comprising: a memory storing a programmable atomic transaction; a processor, the processor configured to: receive, from a second processor communicatively coupled to the programmable atomic unit, a command to execute the programmable atomic transaction; execute the programmable atomic transaction, the programmable atomic transaction comprising a set of one or more instructions to perform operations; determine, during execution of the programmable atomic transaction, an exception condition corresponding to the programmable atomic transaction; terminate execution of the instruction set; generate a response indicating the exception; and sending the response to the processor.

In Example 2, the subject matter of Example 1 includes, wherein the processor notifies an operating system of the exception.

In Example 3, the subject matter of Examples 1-2 includes, wherein the response includes a program counter.

In Example 4, the subject matter of Examples 1-3 includes, wherein the response includes memory state information of the state of the memory of the programmable atomic unit.

In Example 5, the subject matter of Examples 1-4 includes, wherein the response comprises one or more values stored in a register of the programmable atomic unit.

In Example 6, the subject matter of Examples 1-5 includes, wherein the programmable atomic unit is on a same chiplet as the memory controller, the memory controller controlling a Random Access Memory (RAM) bank.

In Example 7, the subject matter of Examples 1-6 includes, wherein the memory controller is on a chiplet that is coupled to a second chiplet, the second chiplet comprising the second processor.

In Example 8, the subject matter of Examples 1-7 includes, wherein the exception condition is exceeding an instruction execution limit.

In Example 9, the subject matter of Examples 1-8 includes, wherein the exception condition is an execution of an instruction that is in a memory partition of the programmable atomic unit with an index that is greater than a sum of a first index of the programmable atomic transaction and a partition count of the programmable atomic transaction.

Example 10 is a method comprising: receiving, by a programmable atomic unit of a memory controller, from a processor, a command to execute a programmable atomic transaction stored in a memory of the programmable atomic unit corresponding to a programmable atomic transaction; executing, by a processor of the programmable atomic unit, the programmable atomic transaction, the programmable atomic transaction comprising a set of one or more instructions to perform operations; determining, during execution of the programmable atomic transaction, an exception condition corresponding to the programmable atomic transaction; terminate execution of the instruction set; generate a response indicating the exception; and sending the response to the processor.

In Example 11, the subject matter of Example 10 includes, wherein the processor notifies an operating system of the exception.

In Example 12, the subject matter of Examples 10-11 includes, wherein the response includes a program counter.

In Example 13, the subject matter of Examples 10-12 includes, wherein the response includes memory state information of the state of the memory of the programmable atomic unit.

In Example 14, the subject matter of Examples 10-13 includes, wherein the response comprises one or more values stored in a register of the programmable atomic unit.

In Example 15, the subject matter of Examples 10-14 includes, wherein the programmable atomic unit is coupled to a memory controller, the memory controller controlling one or more Random Access Memory (RAM) banks.

In Example 16, the subject matter of Examples 10-15 includes, wherein the memory controller is on a chiplet that is coupled to a second chiplet, the second chiplet comprising the processor.

In Example 17, the subject matter of Examples 10-16 includes, wherein the exception condition is exceeding an instruction execution limit.

In Example 18, the subject matter of Examples 10-17 includes, wherein the exception condition is an execution of an instruction that is in a memory partition of the programmable atomic unit with an index that is greater than a sum of a first index of the programmable atomic transaction and a partition count of the programmable atomic transaction.

Example 19 is a non-transitory machine-readable medium, storing instructions, which when executed, causes a machine to perform operations comprising: receiving, by a programmable atomic unit of a memory controller, from a processor, a command to execute a programmable atomic transaction stored in a memory of the programmable atomic unit corresponding to a programmable atomic transaction; executing, by a processor of the programmable atomic unit, the programmable atomic transaction, the programmable atomic transaction comprising a set of one or more instructions to perform operations; determining, during execution of the programmable atomic transaction, an exception condition corresponding to the programmable atomic transaction; terminating execution of the instruction set; generating a response indicating the exception; and sending the response to the processor.

In Example 20, the subject matter of Example 19 includes, wherein the processor notifies an operating system of the exception.

In Example 21, the subject matter of Examples 19-20 includes, wherein the response includes a program counter.

In Example 22, the subject matter of Examples 19-21 includes, wherein the response includes memory state information of the state of the memory of the programmable atomic unit.

In Example 23, the subject matter of Examples 19-22 includes, wherein the response comprises one or more values stored in a register of the programmable atomic unit.

In Example 24, the subject matter of Examples 19-23 includes, wherein the programmable atomic unit is coupled to a memory controller, the memory controller controlling one or more Random Access Memory (RAM) banks.

In Example 25, the subject matter of Examples 19-24 includes, wherein the memory controller is on a chiplet that is coupled to a second chiplet, the second chiplet comprising the processor.

In Example 26, the subject matter of Examples 19-25 includes, wherein the exception condition is exceeding an instruction execution limit.

In Example 27, the subject matter of Examples 19-26 includes, wherein the exception condition is an execution of an instruction that is in a memory partition of the programmable atomic unit with an index that is greater than a sum of a first index of the programmable atomic transaction and a partition count of the programmable atomic transaction.

Example 28 is an apparatus comprising: means for receiving, by a programmable atomic unit of a memory controller, from a processor, a command to execute a programmable atomic transaction stored in a memory of the programmable atomic unit corresponding to a programmable atomic transaction; means for executing, by a processor of the programmable atomic unit, the programmable atomic transaction, the programmable atomic transaction comprising a set of one or more instructions to perform operations; means for determining, during execution of the programmable atomic transaction, an exception condition corresponding to the programmable atomic transaction; means for terminating execution of the instruction set; means for generating a response indicating the exception; and means for sending the response to the processor.

In Example 29, the subject matter of Example 28 includes, wherein the processor notifies an operating system of the exception.

In Example 30, the subject matter of Examples 28-29 includes, wherein the response includes a program counter.

In Example 31, the subject matter of Examples 28-30 includes, wherein the response includes memory state information of the state of the memory of the programmable atomic unit.

In Example 32, the subject matter of Examples 28-31 includes, wherein the response comprises one or more values stored in a register of the programmable atomic unit.

In Example 33, the subject matter of Examples 28-32 includes, wherein the programmable atomic unit is coupled to a memory controller, the memory controller controlling one or more Random Access Memory (RAM) banks.

In Example 34, the subject matter of Examples 28-33 includes, wherein the memory controller is on a chiplet that is coupled to a second chiplet, the second chiplet comprising the processor.

In Example 35, the subject matter of Examples 28-34 includes, wherein the exception condition is exceeding an instruction execution limit.

In Example 36, the subject matter of Examples 28-35 includes, wherein the exception condition is an execution of an instruction that is in a memory partition of the programmable atomic unit with an index that is greater than a sum of a first index of the programmable atomic transaction and a partition count of the programmable atomic transaction.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory controller disposed on a chiplet, the memory controller comprising:
a processor;
a memory partitioned into a plurality of partitions storing a previously stored configurable instruction set stored in one or more of the plurality of partitions by a second processor on a second chiplet that is communicatively coupled to the memory controller across an inter-chiplet interface;
the processor configured to:
receive, from the second processor on the second chiplet, a command to execute a configurable instruction set, the command specifying a first instruction of the configurable instruction set using a partition index of the plurality of partitions;
responsive to receiving the command:
identifying a number of partitions used by the configurable instruction set and an instruction execution limit;
causing execution of the configurable instruction set by causing execution of the first instruction stored in a first partition of the plurality of partitions indicated by the partition index and subsequent instructions;
determine, during execution of the configurable instruction set, that an exception condition corresponding to the configurable instruction set has occurred;
responsive to determining the exception condition:
causing termination of execution of the configurable instruction set; and
sending a response to the second processor indicating the exception condition.

2. The memory controller of claim 1, wherein the exception condition comprises one of: the instruction execution limit being reached or execution of an instruction in a partition beyond the number of partitions used by the configurable instruction set.

3. The memory controller of claim 1, wherein the response includes a program counter value corresponding to the exception condition.

4. The memory controller of claim 1, wherein the response includes register state information of registers of the processor at a time of the exception condition.

5. The memory controller of claim 1, wherein the memory controller and the second processor are on separate chiplets connected by an interposer.

6. The memory controller of claim 1, wherein the configurable instruction set is provided by the second processor.

7. The memory controller of claim 1, wherein the processor is further configured to release any locks held during execution of the configurable instruction set upon determining the exception condition.

8. A method comprising:
receiving, by a first processor on a first chiplet from a second processor on a second chiplet, a command to execute a configurable instruction set stored in a memory partitioned into a plurality of partitions, the command specifying a first instruction of the configurable instruction set using a partition index of the plurality of partitions;
responsive to receiving the command:
identifying a number of partitions used by the configurable instruction set and an instruction execution limit;
causing execution of the configurable instruction set by causing execution of the first instruction stored in a first partition of the plurality of partitions indicated by the partition index and subsequent instructions;
determining, during execution of the configurable instruction set, that an exception condition corresponding to the configurable instruction set has occurred;
responsive to determining the exception condition:
causing termination of execution of the configurable instruction set; and
sending a response to the second processor indicating the exception condition.

9. The method of claim 8, wherein the exception condition comprises one of: the instruction execution limit being reached or execution of an instruction in a partition beyond the number of partitions used by the configurable instruction set.

10. The method of claim 8, wherein the response includes a program counter value corresponding to the exception condition.

11. The method of claim 8, wherein the response includes register state information of registers of the first processor at a time of the exception condition.

12. The method of claim 8, wherein the first processor and the second processor are on separate chiplets connected by an interposer.

13. The method of claim 8, wherein the configurable instruction set is provided by the second processor.

14. The method of claim 8, further comprising releasing any locks held during execution of the configurable instruction set upon determining the exception condition.

15. A non-transitory machine-readable medium, storing instructions, which when executed by a machine, cause the machine to perform operations comprising:
receiving, from a second processor on a second chiplet, a command to execute a configurable instruction set stored in a memory partitioned into a plurality of partitions, the command specifying a first instruction of the configurable instruction set using a partition index of the plurality of partitions;
responsive to receiving the command:
identifying a number of partitions used by the configurable instruction set and an instruction execution limit;
causing execution of the configurable instruction set by causing execution of the first instruction stored in a first partition of the plurality of partitions indicated by the partition index and subsequent instructions;
determining, during execution of the configurable instruction set, that an exception condition corresponding to the configurable instruction set has occurred;
responsive to determining the exception condition:
causing termination of execution of the configurable instruction set; and
sending a response to the second processor indicating the exception condition.

16. The non-transitory machine-readable medium of claim 15, wherein the exception condition comprises one of: the instruction execution limit being reached or execution of an instruction in a partition beyond the number of partitions used by the configurable instruction set.

17. The non-transitory machine-readable medium of claim 15, wherein the response includes a program counter value corresponding to the exception condition.

18. The non-transitory machine-readable medium of claim 15, wherein the response includes register state information of registers at a time of the exception condition.

19. The non-transitory machine-readable medium of claim 15, wherein the operations are performed by a first processor on a first chiplet and the second processor is on a second chiplet connected to the first chiplet by an interposer.

20. The non-transitory machine-readable medium of claim 15, wherein the configurable instruction set is provided by the second processor.

* * * * *